Feb. 7, 1967     B. MERICLE, JR     3,302,943
HOLD-DOWN CLAMP

Filed Dec. 19, 1963     2 Sheets-Sheet 1

INVENTOR
BOYD MERICLE JR.

BY Beaman & Beaman

ATTORNEYS

Feb. 7, 1967   B. MERICLE, JR   3,302,943
HOLD-DOWN CLAMP

Filed Dec. 19, 1963   2 Sheets-Sheet 2

INVENTOR
BOYD MERICLE JR.

BY *Beaman & Beaman*

ATTORNEYS

United States Patent Office 3,302,943
Patented Feb. 7, 1967

3,302,943
HOLD-DOWN CLAMP
Boyd Mericle, Jr., Jackson, Mich., assignor to Simplex Level Company, Inc., Jackson, Mich., a corporation of Michigan
Filed Dec. 19, 1963, Ser. No. 331,886
13 Claims. (Cl. 269—32)

The invention pertains to a hold-down clamp, and particularly relates to a hold-down clamp of the fluid actuated type.

The invention pertains to that portion of the vise or clamping art relating to devices having a member adapted to impose a force on an article mounted on a supporting surface, whereby the article will be "held down" on the supporting surface. Such devices are commonly known as hold-down clamps and find wide usage in the mechanical arts.

A basic object of the invention is to provide a fluid actuated hold-down clamp of a simplified construction wherein hold down pressures of large magnitude may be produced with relatively low fluid actuator medium pressures.

Another object of the invention is to provide a hold-down clamp including a lever arm having article engaging means mounted thereon wherein the lever arm is lifted and retracted from the article being clamped, thereby providing clearance adjacent the article when the lever arm is in the unclamped or inoperative position.

Another object of the invention is to provide a fluid actuated hold-down clamp wherein the fluid actuator constitutes the support for the clamping mechanism, and the entire unit is of a concise and compact configuration.

An additional object of the invention is to provide a hold-down clamp utilizing a lever arm supporting the article engaging means wherein the article engaging means is raised from the article being clamped and then retracted therefrom during the lever arm unlocking movement, and during the lever arm locking movement the article engaging means is positioned over the article to be clamped and then lowered into engagement therewith.

A further object of the invention is to provide a hold-down clamp embodying a lever arm supporting article engaging means wherein the sequence of movement of the lever arm is accomplished with a minimum of structure and high clamping pressures are produced.

An additional object of the invention is to provide a hold-down clamp powered by a fluid actuator including a piston rod wherein thrust bearing means are employed to prevent imposing excessive bending pressures on the fluid actuator piston rod.

Figure 1:
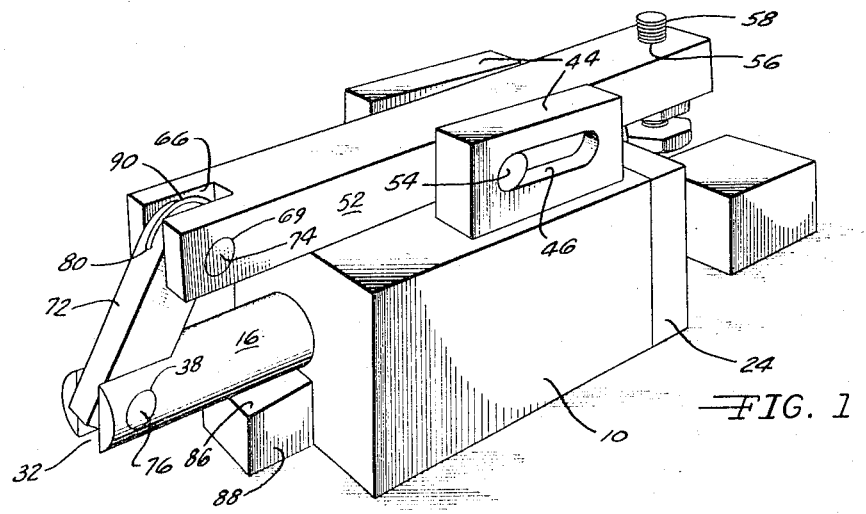
Figure 2:
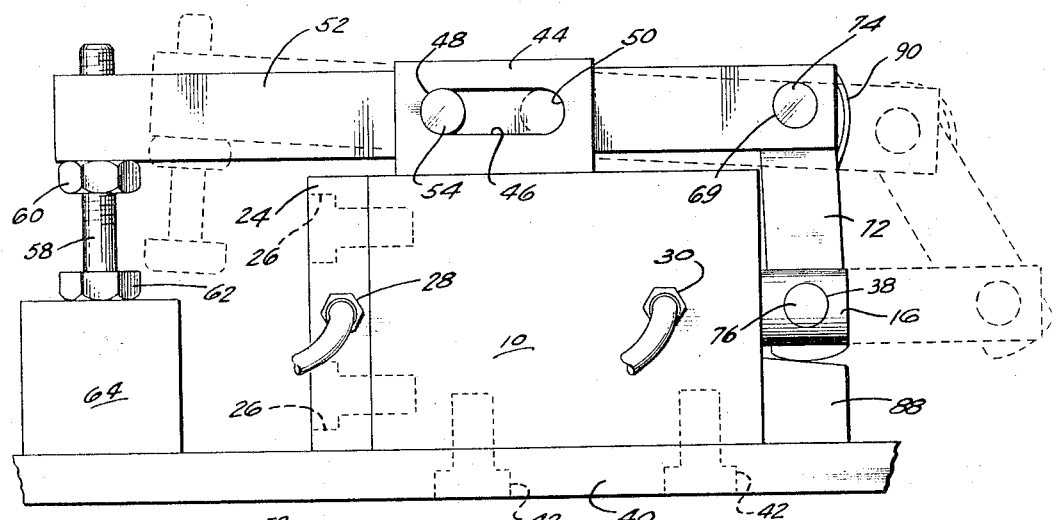
Figure 3:
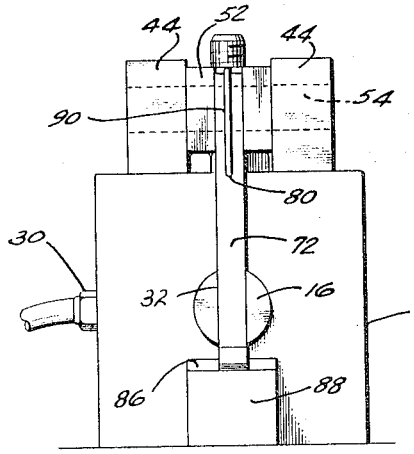
Figure 5:
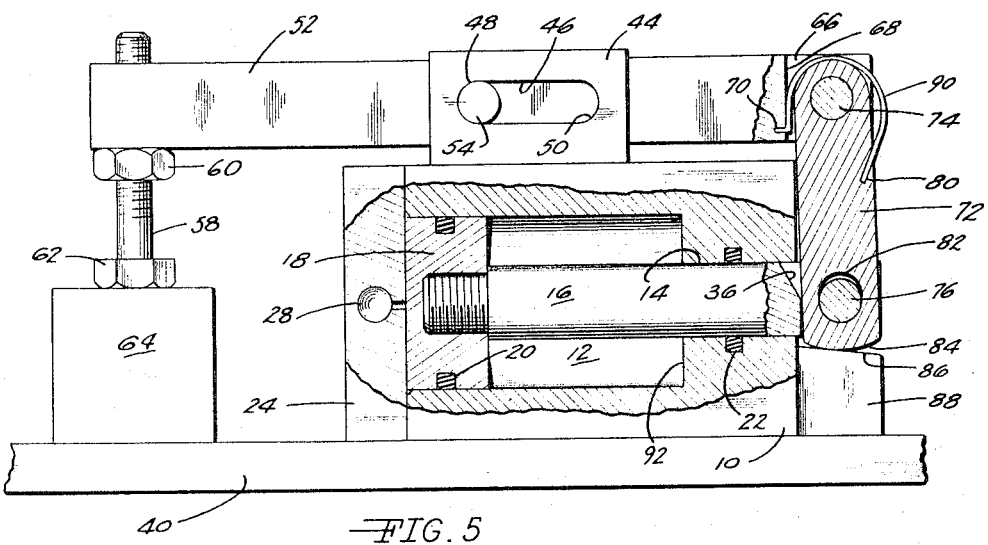
Figure 4:
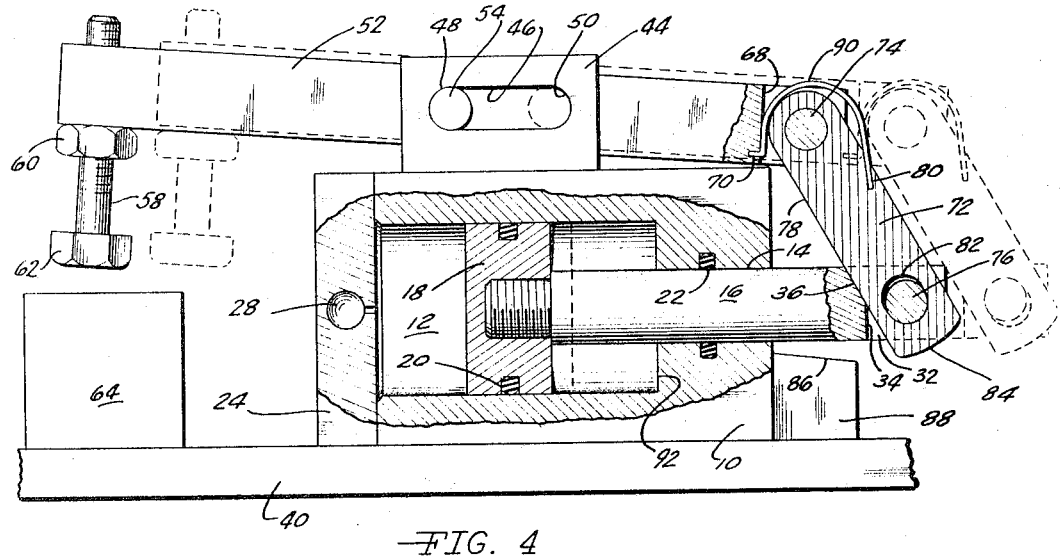

These and other objects of the invention arising from the details and relationships of the components of an embodiment thereof will be apparent from the following description and accompanying drawings wherein:

FIG. 1 is a perspective view of the rear side of a hold-down clamp in accord with the invention showing the actuator and lever arm in the retracted or inoperative position, FIG. 2 is an elevational view of a hold-down clamp in accord with the invention, illustrating the clamping or operative component positions in full lines and the unclamped or inoperative component positions in dotted lines, FIG. 3 is an elevational, rear view of the hold-down clamp in accord with the invention, FIG. 4 is an elevational view, partly in section, of a hold-down clamp in accord with the invention when the lever arm is positioned above the article to be clamped and is in its extreme reciprocal position toward the article, the full retracted position of the lever arm, link and piston rod being shown in dotted lines, FIG. 5 is an elevational view, partly in section, of a hold-down clamp in accord with the invention illustrating the lever arm, linkage and fluid actuator components during the clamping operation.

Preferably, the base or primary support for the hold-down clamp in accord with the invention is in the form of a rectangular block 10. The block 10 is interiorly provided with a bore constituting a cylinder 12 of a fluid actuator. The block 10 is also bored at 14 concentric with the cylinder 12, whereby the piston rod 16 may exteriorly project from the block. The inner end of the piston rod 16 is provided with a piston 18 threadedly connected thereto. Sealing ring 20 seals the piston with respect to the cylinder 12, and sealing ring 22 prevents fluid from escaping through the bore 14 between the bore and the piston rod 16. The open end of the cylinder 12 is sealed by means of a rectangular head 24 attached to the end of the block 10 by bolts 26, shown in dotted lines in FIG. 2. A port 28 is defined in the head 24 for permitting entrance of a pressurized fluid medium into the cylinder 12 on the head side of the piston 18. A port 30 is defined in the block 10 in communication with the cylinder 12 on the piston rod side of the piston. The ports 28 and 30 are in communication with a pressurized fluid medium, either air or hydraulic oil, controlled by conventional valving means, not shown, whereby the piston and piston rod may be moved in either direction within the cylinder 12, as desired.

The exterior end of the piston rod 16 is diametrically slotted at 32. The slot 32 includes a linkage abutment surface 34 disposed at right angles to the longitudinal axis of the piston rod and a linkage abutment surface 36 obliquely related to the piston rod axis. The piston rod 16 is also provided with a diametrical bore 38 perpendicularly intersecting the slot 32.

The hold-down clamp block 10 is adapted to be mounted on a supporting surface, such as plate 40, FIG. 2, by means of threaded holes defined on the underside of the block, whereby bolts 42 extending through the underside of the plate 40 will cooperate with the threaded block holes and firmly affix the block to the supporting plate.

Two identical lever arm support block 44 are mounted in spaced relation on the upper surface of the block 10. Each of the blocks 44 includes an elongated slot 46 having a longitudinal length extending generally parallel to the axis of the piston rod 16. The ends of the slots 46 are defined by concave, arcuate abutment surfaces 48 and 50 which are in a spaced, opposed relationship.

A lever arm 52 is located between the support blocks 44 and provided with a pivot pin 54 in its central region. The pivot pin 54 is of a diameter substantially equal to the height of the slots 46 and is received therein as will be apparent from the drawings. The combination of the pivot pin 54 and the slots 46 permits the lever arm 52 to be both pivoted and reciprocally translated relative to the block 10. The forward region of the lever arm 52 is provided with a threaded hole 56, FIG. 1, perpendicularly related to the axis of the pivot pin 54. A threaded hold-down member 58 is adjustably received within the hole 56 and its position thereto may be fixed by means of a lock nut 60. The head 62 of the hold-down member is adapted to engage the article 64 to be clamped.

The rear region of the lever arm 52 is slotted at 66 and provided with a hole 69 extending therethrough which transversely intersects the slot. The slot 66 is defined by a base surface 68 in which a spring anchor hole 70 is defined, FIGS. 4 and 5.

A rigid link 72 is interposed between the piston rod 16 and the rear region of the lever arm 52. Link 72 is received within the slots 32 and 66, and is attached to the lever arm 52 by a pivot pin 74 extending through hole 69 and to the piston rod 16 by a pivot pin 76 extending through the bore 38. The link 72 is provided with a surface 78 adapted to engage piston rod surface 36, as shown in FIG. 4, and a spring anchor hole 80 is defined in the outer surface of the link. The hole 82, which cooperates with the piston rod pivot pin 76, is preferably of an elongated configuration wherein the elongated major dimension extends in the direction toward the pivot pin 74.

The lower end of the link 72 is provided with a radius 84 for cooperation with a thrust bearing surface 86 defined on the bearing block 88. The bearing block 88 is mounted on the block 10 and the thrust bearing surface 86 is obliquely related to the piston rod 16 and cooperates with the rounded link surface 84, as will be later described. Preferably, the link surface 84 and the thrust bearing surface 86 are heat treated or formed of wear-resistant alloys.

A spring 90 is inserted in the lever arm hole 70 and the link hole 80, and is a configuration which will be apparent from FIGS. 4 and 5. The purpose of the spring 90 is to bias the link 72 in a counterclockwise direction relative to the lever arm 52 as viewed in FIGS. 4 and 5. Thus, the spring 90 tends to bias the link 72 in the direction which forms an obtuse angle between the link and the lever arm 52.

The operation of the hold-down clamp in accord with the invention is as follows:

Assuming the hold-down clamp components to be in the operative or clamping relationship shown in full lines in FIGS. 2 and 5, the piston 18 will be engaging the head 24, the link surface 84 will be engaging the thrust bearing surface 86, and the head 62 of the hold-down member 58 will be engaging and holding the article 64. It will be noted that in this relationship the pivot pin 54 is in engagement with the slot abutment end 48.

When it is desired to release the hold-down clamp, fluid is introduced into the cylinder 12 through the port 28. The initial movement of the piston 18 to the right, FIG. 4, results in the link surface 84 disengaging from the thrust bearing surface 86, and the pivot pin 76 moves to the right, with respect to the lever arm pivot pin 74. As the piston rod 16 moves to the right, with respect to the lever arm 52, the pull exerted on the lever arm by the link 72 and the biasing force imposed on the lever arm by spring 90, tends to pivot the rear region of the lever arm toward the piston rod, thereby lifting the hold-down member 58 from the article 64. FIG. 4 illustrates the relationship of the components in full lines when raising of the hold-down member is completed and prior to the beginning of the reciprocal movement of the lever arm. It will be noted that at this relationship the link surface 78 is in engagement with the piston rod slot surface 36.

Further movement of the piston rod 16 to the right, under the influence of the pressurized fluid being introduced into the cylinder 12 through the port 28, causes the lever arm 52 to move to the right to the position shown in dotted lines in FIGS. 2 and 4. During this retracting movement of the lever arm 52 in an unlocking direction the lever arm remains in a "tilted" relationship to the block 10 in that the rear region of the lever arm is being pulled downwardly by the link 72 and spring 90. Movement of the lever arm 52 to the right continues until the piston 18 engages the cylinder end 92. As such time the pivot pin 54 also engages the slot abutment ends 50. The lever arm 52 is now in the fully retracted position, and a new article 64 may be positioned for clamping during the next cycle of hold-down clamp operation.

When it is desired to return the hold-down clamp to the operative position, the port 28 is placed in communication with the exhaust conduit of the fluid circuit and pressurized fluid medium is introduced into the port 30. Movement of the piston rod 16 to the left, as viewed in FIGS. 2, 4 and 5, causes the link pin 76 to engage the upper end of the hole 82, as shown in dotted lines in FIG. 4, and the link 72 moves the lever arm 52 to the left in a locking direction. During such movement the lever arm 52 will remain in the tilted relationship to the support block 10, wherein the hold-down member 58 will be in the raised position. Assurance that the lever arm 52 will remain in the raised or tilted position during movement of the lever arm in a locking direction results from the biasing force being imposed between the link 72 and the lever arm 52 by the spring 90. Thus, the spring 90 is tending to prevent clockwise rotation of the link 72 relative to the lever arm 52 about the pin 74 as the piston rod 16 is moving the link and the lever arm to the left in a locking direction. The relationship of the link 74 and the lever arm 52 remains as shown in the dotted lines of FIG. 4 until the pivot pin 54 engages the slot abutment ends 48.

Upon the pivot pin 54 engaging the slot abutment ends 48, further reciprocal movement of the lever arm 52 in the locking direction is prevented, and further movement of the piston rod 16 toward the head 24 tends to pivot the link 72 in a clockwise direction on pivot 74 raising the rear region of the lever arm and moving the hold-down member 58 toward the article 64. As the piston rod 16 moves toward the head 24, it will be appreciated that the link 72 is approaching a right angle relationship with the lever arm 52. As the angle defined by the imaginary lines interconnecting the pivot pins 54 and 74 and the pivot pins 74 and 76 approaches a right angle, the degree of pivoting movement produced in the lever arm 52, with respect to the degree of reciprocal movement of the piston rod 16, decreases. Thus, during the final stages of piston rod movement, as the aforementioned angle approaches a right angle, a high mechanical advantage between the piston rod movement and lever arm pivoting action is produced, which results in high hold-down pressures with relatively small fluid medium pressures within the cylinder 12.

The piston 18 engages the head 24 before the pivot pins 74 and 76 assume an "on-center" relationship. In other words, the piston engages the head before the angle, defined by the imaginary line interconnecting the center of the piston pins 54 and 74 and the line interconnecting the centers of the pivot pins 74 and 76, equals a right angle. By terminating the piston rod movement prior to the pivot pins assuming an "on-center" relationship, the need for high fluid pressures to unclamp the device from the article 64 is eliminated.

During the final stages of movement of the piston rod 16 in a locking direction, the arcuate surface 84 of the link 72 engages the thrust bearing surface 86 directly imposing the considerable compression forces created within the link on the thrust bearing block 88, rather than subjecting the piston rod 16 to a bending moment. By employing the elongated hole 82 within the link in association with the pivot pin 76, the compression forces within the link will not be directly imposed on the piston rod. The use of the arcuate surface 84 and the thrust bearing block 88 is particularly desirable in clamps producing high clamping pressures. In those clamps wherein relatively low fluid medium pressures are employed and the movement of the piston is restricted before high compression forces are created in the link, the need for the thrust bearing block and the link surface 84 is eliminated, as such forces may be imposed upon the piston rod without danger of bending or damaging the piston rod. Of course, in lower capacity clamps wherein a thrust bearing block is not being employed, the hole 82 within the link 72 will not be elongated and will be of a cylindrical configuration conforming to the pin 76.

It will be appreciated that the aforedescribed hold-down clamp produces a clamp of high force-producing characteristics with a minimum of components, and maintenance of the clamp components is readily accomplished as all the components are readily accessible.

It is appreciated that various modifications to the invention may be apparent to those skilled in the art without departing from the spirit and scope thereof, for instance, the slot permitting reciprocal movement of the lever arm could be defined in the lever arm and the lever arm pivot pin could be fixed on the support blocks 44, and it is intended that the invention be defined only by the scope of the following claims.

I claim:
1. A hold-down clamp comprising, in combination,
   (a) an elongated lever having a forward region and a rear region,
   (b) a lever support supporting said lever for both pivotal movement and reciprocal movement in the direction of the length of said lever, said reciprocal lever movement in one direction constituting a locking movement and in the other direction constituting an unlocking movement,
   (c) hold-down means mounted on said lever forward region,
   (d) a rigid link pivotally attached at a first location to said lever rear region,
   (e) a linear actuator supported for movement relative to said lever support in a direction substantially corresponding to the direction of reciprocal movement of said lever, said actuator being movable a distance greater than the reciprocal movement of said lever, said link being pivotally attached at a second location to said actuator, said second pivot location being spaced from said first pivot location, and
   (f) means interposed between said rear region of said lever and said link producing a predetermined resistance to pivoting of said link relative to said lever and maintaining a predetermined angular relationship between said link and lever during reciprocal movement of said actuator and lever in a locking direction.

2. A hold-down clamp comprising, in combination,
   (a) an elongated lever having a forward region and a rear region,
   (b) lever support means including an elongated slot etxending in the direction of the longitudinal length of said lever having first and second opposed, spaced slot abutments and a pivot pin extending into said slot, said slot permitting reciprocal movement of said lever relative to said support and said pivot pin pivotally supporting said lever, reciprocal lever movement in one direction constituting a locking movement and in the opposite direction constituting an unlocking movement,
   (c) hold-down means mounted on said lever forward region,
   (d) a rigid link pivotally attached at a first location to said lever rear region, and
   (e) a linear acutator supported for movement in a fixed path and movable relative to said lever support in a direction substantially corresponding to the direction of reciprocal movement of said lever, said actuator being movable a distance greater than the distance separating said slot abutments, said link being pivotally attached at a second location to said actuator, said second pivot location being spaced from said first pivot location.

3. A hold-down clamp comprising, in combination,
   (a) an elongated lever having a forward region and a rear region,
   (b) lever support means including an elongated slot extending in the direction of the longitudinal length of said lever having first and second opposed, spaced slot abutments and a pivot pin extending into said slot, said slot permitting reciprocal movement of said lever relative to said support and said pivot pin pivotally supporting said lever, reciprocal lever movement in one direction constituting a locking movement and in the opposite direction constituting an unlocking movement,
   (c) hold-down means mounted on said lever forward region,
   (d) a rigid link pivotally attached at a first location to said lever rear region, and
   (e) an expansible motor including a reciprocable piston and piston rod, said piston rod being movable in a fixed linear path and in a direction substantially corresponding to the direction of the longitudinal dimension of said slot, said piston rod reciprocal movement being greater than the distance separating said slot abutments, said link being pivotally attached at a second location to said piston rod, said second pivot location being spaced from said first pivot location.

4. A hold-down calmp comprising, in combination,
   (a) an elongated lever having a forward region and a rear region,
   (b) lever support means including an elongated slot extending in the direction of the longitudinal length of said lever having first and second opposed, spaced slot abutments and a pivot pin extending into said slot, said slot permitting reciprocal movement of said lever relative to said support and said pivot pin pivotally supporting said lever, reciprocal lever movement in one direction constituting a locking movement and in the other direction constituting an unlocking movement,
   (c) hold-down means mounted on said lever forward region,
   (d) a rigid link pivotally attached at a first location to said lever rear region,
   (e) an expansible motor including a reciprocable piston and piston rod, said piston rod being movable in a linear direction substantially corresponding to the direction of the longitudinal dimension of said slot, said piston rod reciprocal movement being greater than the distance separating said slot abutments, said link being pivotally attached at a second location to said piston rod, said second pivot location being spaced from said first pivot location, and
   (f) means interposed between said rear region of said lever and said link producing a predetermined resistance to pivoting of said link relative to said lever and maintaining a predetermined angular relationship between said link and lever during reciprocal movement of said piston rod and lever in a locking direction.

5. A hold-down clamp comprising, in combination,
   (a) an elongated lever having a forward region and a rear region,
   (b) lever support means including an elongated slot extending in the direction of the longitudinal length of said lever having first and second opposed, spaced slot abutments and a pivot pin extending into said slot, said slot permitting reciprocal movement of said lever relative to said support and said pivot pin pivotaly supporting said lever, reciprocal lever movement in one direction constituting a locking movement and in the opposite direction constituting an unlocking movement,
   (c) hold-down means mounted on said lever forward region,
   (d) a rigid link pivotally attached at a first location to said lever rear region,
   (e) an expansible motor including a reciprocable piston and piston rod, said piston rod being movable in a linear direction substantially corresponding to the direction of the longitudinal dimension of said slot, said piston rod reciprocal movement being greater than the distance separating said slot abutments, said link being pivotally attached at a second location to said piston rod, said second pivot location being spaced from said first pivot location, (f) means producing a predetermined resistance to pivoting of said link relative to said lever and maintaining a predetermined angular relationship between said link and lever during reciprocal movement of said lever in a locking direction, and
(g) stop means operatively associated with said piston rod limiting movement of said piston rod when moving in a direction causing pivoting of said lever in a direction moving said hold-down means toward an article to be engaged and said first slot abutment and pin are in engagement, said stop means limiting movement of said piston rod as said first and second link pivot locations near an on-center relationship.

6. A hold-down clamp comprising, in combination,
(a) an expansible motor including a cylinder defined by opposed end walls, a piston reciprocably mounted within said cylinder, a piston rod affixed to said piston,
(b) an elongated lever having a forward region and a rear region,
(c) lever support means supporting said lever upon said expansible cylinder, said support means including an elongated slot extending in the direction of the longitudinal length of said lever having first and second opposed, spaced slot abutments and a pivot pin extending into said slot, said slot permitting reciprocal movement of said lever relative to said support and said pivot pin pivotally supporting said lever, reciprocal lever movement in one direction constituting a locking movement and in the opposite direction constituting an unlocking movement, the spacing between said slot abutments being less than the reciprocal movement of said piston rod and the longitudinal length of said slot being generally parallel to said piston rod,
(d) hold-down means mounted on said lever forward region,
(e) a rigid link,
(f) a first pivot pin pivotally connecting said link to said lever rear region and a second pivot pin spaced from said first pivot pin pivotally connecting said link to said piston rod, and
(g) means producing a predetermined resistance to pivoting of said link relative to said lever and maintaining a predetermined angular relationship between said link and lever during reciprocal movement of said lever in a locking direction.

7. In a hold-down clamp as in claim 6 wherein,
(a) said means producing a predetermined resistance to pivoting of said link comprises a spring interposed between said rear region of said lever and said link tending to pivot said link relative to said lever.

8. In a hold-down clamp as in claim 6 wherein,
(a) stop means are operatively associated with said piston rod limiting movement of said piston rod when said piston rod and lever are moving in the direction constituting the lever-locking movement and said slot abutment and pin are in engagement, said stop means limiting movement of said piston rod as said first and second pivot pins near an on-center relationship.

9. In a hold-down clamp as in claim 8, wherein (a) a link thrust bearing is defined upon said expansible motor, said link thrust bearing engaging said link as said piston rod approaches said stop means.

10. A hold-down clamp comprising, in combination,
(a) an expansible motor including a cylinder defined by opposed end walls, a piston reciprocably mounted within said cylinder, a piston rod affixed to said piston,
(b) a lever having a forward region and a rear region,
(c) a support block mounted on said expansible motor,
(d) an elongated slot defined in said support block, the length of said slot extending in a direction substantially parallel to said piston rod, said slot being defined at its ends by first and second opposed end abutment separated by a distance less than the operative movement of said piston rod,
(e) a pin mounted upon said lever and slidably and pivotably received within said slot permitting selective reciprocal movement of said lever in a lever-locking direction and opposite lever-unlocking direction,
(f) hold-down means mounted on said lever forward region,
(g) a rigid link,
(h) a first pivot pin pivotally connecting said link to said lever rear region and a second pivot pin spaced from said first pivot pin pivotally connecting said link to said piston rod, and
(i) a spring interposed between said rear region of said lever and said link tending to resist pivoting of said link relative to said lever when said piston rod is moving in the direction of the locking movement of said lever.

11. In a hold-down clamp as in claim 10, wherein
(a) termination of reciprocal movement of said lever in the lever-locking direction occurs after said pin engages said first slot and abutment and said piston engages one of said cylinder end walls, said piston engaging said cylinder end wall upon said first and second pivot pins nearing an on-center relationship.

12. In a hold-down clamp as in claim 11, wherein
(a) a link thrust bearing is defined on said expansible motor, said link thrust bearing engaging said link as said piston rod approaches said one cylinder end wall.

13. In a hold-down clamp as in claim 12, wherein
(a) an elongated slot is defined in said link having a longitudinal length extending toward said first pivot pin, said second pivot pin being received within said link elongated slot.

References Cited by the Examiner

UNITED STATES PATENTS

| | | | |
|---|---|---|---|
| 2,341,602 | 2/1944 | Dewey | 269—34 |
| 2,654,518 | 10/1953 | Kindseth | 269—34 |
| 2,815,052 | 12/1957 | Krasnow | 269—31 |
| 2,908,205 | 10/1959 | Furman | 269—31 |

FOREIGN PATENTS 932,218   7/1963   Great Britain.

HAROLD D. WHITEHEAD, *Primary Examiner.*